United States Patent

[11] 3,595,457

[72] Inventor Nils Gustaf Erik Stemme
Goteborg, Sweden
[21] Appl. No. 759,107
[22] Filed Sept. 11, 1968
[45] Patented July 27, 1971
[73] Assignee Facit AB
Atvidaberg, Sweden
[32] Priority Sept. 13, 1967
[33] Sweden
[31] 12,640/1967

[54] MAGNETIC TAPE RECORDER FOR AND CONTINUOUS TAPE FEED AND CASSETTE THEREFOR
2 Claims, 5 Drawing Figs.

[52] U.S. Cl. .......... 226/50, 226/195
[51] Int. Cl. .......... B65h 17/08
[50] Field of Search .......... 242/55, 19 A, 197, 198, 199, 200; /; 226/47, 50, 118, 119, 196, 195; 179/100.2 Z

[56] References Cited

UNITED STATES PATENTS 2,551,198 5/1951 Barrett .......... 179/100.2 Z
3,306,510 2/1967 Brumbaugh .......... 226/118
3,043,531 7/1962 Sinkewitsch .......... 242/198 X

*Primary Examiner*—Richard A. Schacher
*Attorney*—Pierce, Scheffler & Parker

ABSTRACT: A data tape recorder, preferably a magnetic tape recorder, for alternative incremental or continuous feeding of the tape is provided with a holder or fitting for an exchangeable cassette containing the tape. The recorder comprises two complex units. A first one of the two units includes the holder for the cassette, two powered drive rollers for cooperation with the tape, and one of the two operative parts of an electromagnetically controlled tape brake. The second unit includes the second operative part of the brake and a pressure roller for cooperation with every drive roller. The two units can be displaced relative to each other between a position in which a cassette can be inserted into or removed from the holder, and an operative position in which the operative pressure roller constantly presses the tape against the associated drive roller. The two drive rollers are continuously rotating unidirectionally irrespective of whether the tape is moved incrementally or continuously. Said parts of the tape brake are positioned on either side of the tape. The brake is controllable between a tape-blocking position and a tape feed position. Incremental or continuous feed of the tape is obtained by releasing the brake intermittently or for relatively long periods, respectively.

Figure 1:
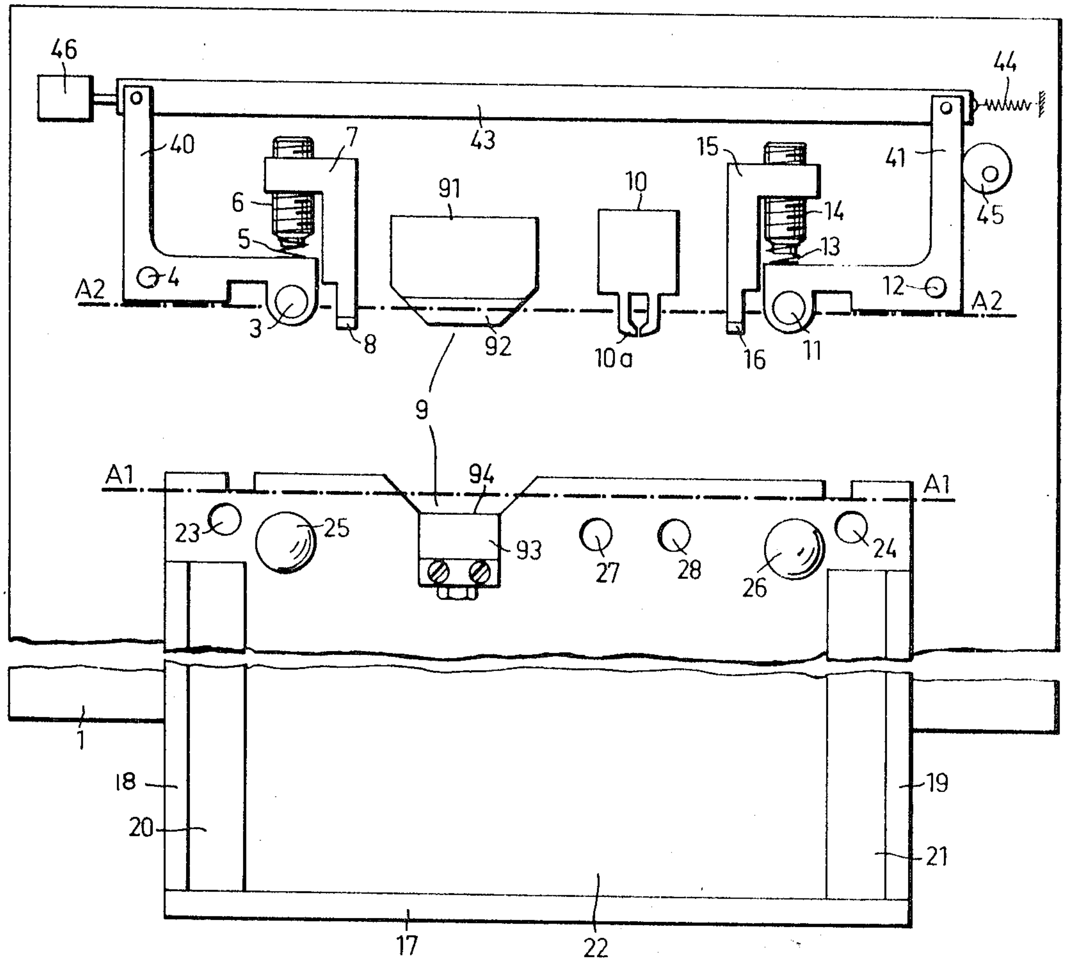

INVENTOR.
Nils Gustaf Erik Stemme
BY
Pierce, Scheffler & Parker
Attorneys

INVENTOR.
Nils Gustaf Erik Stemme
BY
Pierce, Scheffler & Parker
Attorneys

MAGNETIC TAPE RECORDER FOR AND CONTINUOUS TAPE FEED AND CASSETTE THEREFOR

In a tape cassette for the tape recorder the stored tape forms numerous loops and is endless or has ends fixed in the cassette. One end wall of the cassette has two recesses through which the tape extends out of and into the cassette so as to be accessible to a magnetic head and to rollers provided on said second unit. The external portion of the tape extends between the recesses along substantially straight tape-guiding grooves being free of appreciable points of inflection.

Each of the recesses is adapted for insertion of a drive roller being arranged on the first unit, and contains a curved concave inner surface area along which the tape extends in the form of a loop which is kept in engagement with the area by its resilience and stiffness. Upon insertion of the cassette the two loops will automatically lie about the associated drive rollers without manual intervention being required.

The present invention is concerned with an improvement in data-recording apparatus having an exchangeable tape cassette, intended for recording and playback of information during either incremental or continuous feeding of the tape.

Information tape recorders are known in which a magnetic tape is advanced stepwise, synchronously with the information to be recorded. Such tape recorders are used when the information arrives in irregular time sequences, e.g. when the tape recorder is connected to a key-controlled office machine such as an accounting machine. The tape is generally advanced in increments by an electric indexing motor of relatively complicated design. Consequently, hitherto known information tape recorders intended for stepwise advancement of the tape are too expensive to be used for normal office duties.

As a rule, information tape recorders known to the art cannot be incremented at a higher rate than 50—100 data rows/second, and they are therefore not suitable for direct feed into data machines. It is therefore necessary to wind the magnetic tape on spools, which pass to the standard hub used on the magnetic tape stations in the data machines. The spools, however, are difficult to handle, particularly for unskilled personnel, and there is a risk that accumulated dirt and dust will cause reading errors.

It is therefore preferred to store the magnetic tape in some form of cassette. These cassettes are known per se from other magnetic tape apparatus. In one such cassette the tape is wound on two reels secured within the cassette. These reels are provided with clutches which, when the cassette is placed in the magnetic tape apparatus, engage suitable driving shafts. In another type of cassette, the tape lies loose in the cassette in loops, thus obviating the tape-reel-driving clutches. On the other hand, the known cassettes have at least one driving mechanism which is often of the so-called capstan type, cooperating with a pressure-roller or drive spindle. Since, among other things, the pressure-roller must be well centered, they complicate the cassette unnecessarily. Also, because it is usual to have a plurality of cassettes to each tape recorder, it is important that the cassette is made as uncomplicated and cheap as possible.

The present invention is concerned with a data-recording apparatus, particularly intended for optional incremental or continuous advancement of a tapelike record medium which is enclosed in the form of a loose loop in a lightweight, insertable tape cassette, wherewith the apparatus is characterized by two complex units which are movable in relation to each other and of which the one includes at least one holder for the cassette, the cassette if inserted therein, at least one powered drive roller for feeding the tape and which when the cassette is inserted in the apparatus enters a loop formed by the tape, and at least an operative part of a tape brake; while the other complex unit includes a second part of the tape brake and at least one pressure roller cooperating with each drive roller, wherewith the pressure rollers are so arranged that only one pressure roller at a time can abut the loop of tape lying around the associated drive roller, and wherein the two units are displaceable in relation to each other between a cassette inserting and removing position and a recording position in which the operative pressure roller constantly urges the tape against the cooperating drive roller, and maintains a constant tension in the tape when the two operative parts of the brake abut the two sides of the tape, and in which the brake is maneuverable between a tape-locking position and a feed position, incremental or continuous feed being obtained by releasing the brake either intermittently or for long periods.

A tape cassette for use in data-recording apparatus which includes a tape record (carrier) which is either endless or has its ends fastened in the cassette, in which case the one end wall of the cassette is provided with two slots through which a loop of the tape is passed out of and back into the cassette so that said tape loop is accessible to a recording head which is not associated with the cassette itself, the said portion of the tape passing between the slots, and which is thus accessible from without, extends between said slots without presenting appreciable inflection points, preferably essentially straight (linear) and, for this purpose, is passed through guiding recesses or the like in the external surface of the end wall of the cassette. The cassette is preferably so designed that the slots present an essentially cylindrically curved concave inner area, the center of curvature of each of which, when the cassette is inserted in the data-recording apparatus, is coaxial with its respective drive roller and each area has a somewhat larger curvature radius than said roller, but which in the case of a cassette removed from the tape recorder does not house a drive roller, whereby said interior ares are so arranged that the tape engages them by its inherent elasticity and rigidity, so that when the cassette is inserted in the data-recording apparatus, the two curved portions of the tape adjacent said areas automatically lie around associated drive rollers without previous manual adjustment being necessary.

The data-recording apparatus, designed in the form of a tape recorder and the cassette according to the invention can be used, for instance, for recording information obtained from key-controlled office machines such as calculating and accounting machines. The direction in which the tape, i.e. the tapelike record medium, is advanced is optional. The cassette is simple and inexpensive, and contains no complicated or critical parts.

When using the apparatus according to the invention, the office machine is provided with devices, e.g. switches, which produce electric signals representative of digits or other characters inserted in the machine. These signals are fed into the recording means while at the same time advancement of the tape is controlled so that character after character is recorded on the tape. A recording is effected in a suitable code, having for instance eight binary code elements, i.e. positions, in each row perpendicular to the longitudinal direction of the tape. The cassette can be removed when necessary, for instance when the tape in the cassette is full, by a simple hand operation. The full cassettes are sent to a data center where they are placed in a tape reader of similar construction. When transmitting from the tape at the data center it is not necessary to feed the tape incrementally, but the tape can be fed continuously and thus the reading speed and the transmission rate can be maintained high. When changing cassettes, it is possible to place cassette after cassette into the tape recorder without appreciable delay. Neither is it necessary to adopt any special measures for adjusting or arranging the accessible portion of the tape in a cassette in its intended path of movement. This feature also facilitates the design of apparatus for changing cassettes automatically.

Figure 2:
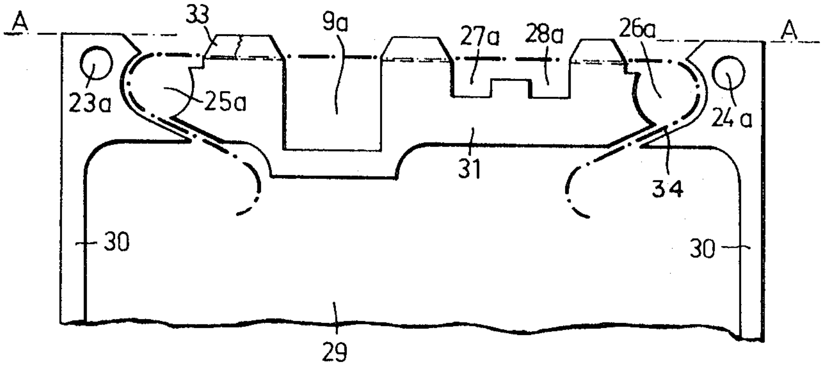
Figure 3:
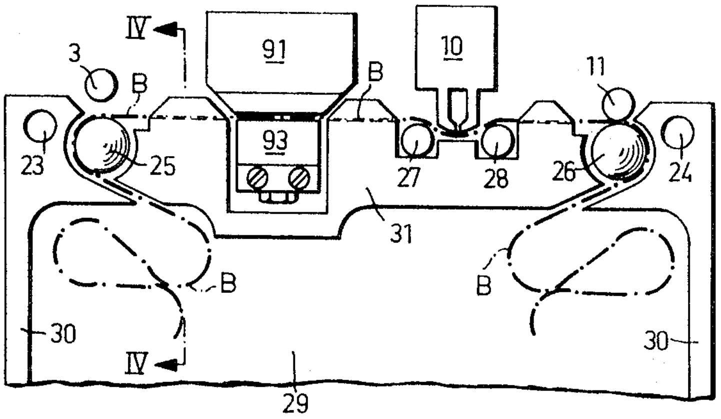
Figure 4A:
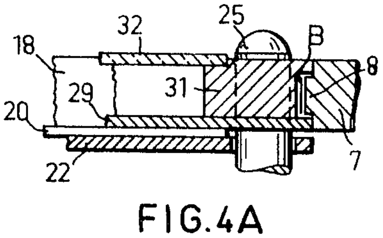
Figure 4B:
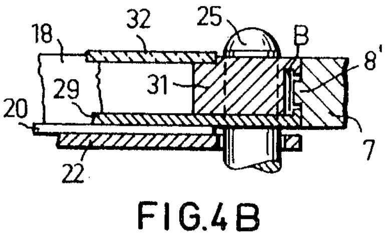

The invention will now be described in more detail with reference to the accompanying drawings, in which FIG. 1 shows diagrammatically and in plan view a tape recorder for use together with tape recorder cassettes for magnetic tape, FIG. 2 shows essential portions of a tape cassette for insertion in a tape recorder according to FIG. 1, FIG. 3 shows the cassette of FIG. 2 but together, FIGS. 4A and 4B are cross sections taken through the line IV–IV in FIG. 3.

In FIG. 1, which diagrammatically shows a data tape recorder for use with tape recorder cassettes for magnetic tape, a panel or bottom plate 1 is provided with a tape cassette fitting or socketlike cavity 17–24 which is securely connected with the bottom plate 1 or which can be displaced in the plane of the drawing in relation to the bottom plate, namely up and down in FIG. 1. The tape recorder can be used in any position, e.g. horizontally or vertically. It is presumed in the following that the tape recorder is used in a position in which the bottom plate 1 and the fitting are horizontal. A pressure-roller 3 is capable of pivoting about a shaft or pin 4 or pivoted by means of said shaft 4, towards and away from the magnetic tape (not shown) and is biassed by a spring 5 in a direction towards the tape. The tension of the spring can be adjusted by means of a setting screw 6 arranged in a member 7, which presents a projection 8 designed as a stationary tape guide. The apparatus also includes a tape brake 9 which includes an electromagnet 91 which is provided with an iron core and dimensioned for permanent excitation and presents a tape-braking surface 92 which when the cassette is inserted in position constantly abuts the tape, and cooperates with an armature or solenoid 93 presenting a tape abutment surface 94 and arranged on the opposite side of the tape to said magnet 91, and which during operation also constantly abuts said tape. The magnet 91 or the solenoid 93, preferably the latter, is sprung to some extent, so that the spring endeavors to force the surfaces 92 and 94 apart, although only to a small extent, so that the air gap to be overcome when exciting the magnet is small. The playback magnetic head 10, which may also be used as a recording head, engages the tape with a surface 10*a*.

To the right of the magnetic head 10, as seen in the drawing, is a second pressure roller 11 which is articulated about or by means of a shaft 12 and which has a spring 13, spring setting screw 14 and member 15 presenting a tape-guiding surface 16, the elements 11—16 preferably being identical to their respective counterparts in elements 3—8 but reversed in relation thereto. It is desirable to situate the pressure rollers and drive rollers as close to each other as possible so that the length of tape to be accelerated past the head is as short as possible.

Each of the pressure rollers 3 and 11 is rotatably secured to its respective angle arm 40 and 41 and, by means of a common operating mechanism, can be swung alternately towards and away from the band so that at all times only one roller is held pressed against the tape. The operating mechanism comprises a link 43 which is pivotally connected with the two angle arms 40,41 and which is spring loaded by means of a tension spring 44 in such a way that it attempts to move the one pressure roller 3 into abutment with the tape on the associating drive roller 25. The link 43 can be made to act in the opposite direction by means of an eccentric 45, so that the pressure roller 11 is urged against the tape by means of the angle arm 41, while the pressure roller 3 is at the same time released. The link 43 can be connected to an electric switch 46 for reversing the drive motor on the drive rollers 25,26, possibly while simultaneously switching the drive speed by switching of the magnetic poles of the motor or the like, and in addition to which the electromagnet 91 of the tape brake 9 is disengaged upon said reversing procedure to rewind the tape. It is assumed in this instance that the pressure rollers 3 and 11 in the shown embodiment rotate in one and the same direction.

The aforementioned elements 3—16 are securely connected with one another (apart from the fact that elements 3—5 and 11—13 are movable to some extent) and so arranged that during playback the tape moves from the left to the right of the figure; that is essentially parallel with the line A2 and somewhat below the same.

The cassette fitting has a baseplate 22 which is in itself dispensable, and end wall 17 and two sidepieces 18,19, each of which extends perpendicular to its respective tape-cassette-positioning bar 20 and 21; the tape cassette will be described below with reference to FIGS. 2—3, and is essentially the form of a rectangular flat box. The other end wall of the fitting is essentially open, and turned towards the unit 3–16.

In the vicinity of each of the two ends of the open end wall of the fitting is positioned firstly a guide pin 23 and 24, adapted to be inserted with a good fit in corresponding guide holes in the cassette, and secondly a constantly rotating, highly polished tape-feeding roller 25 and 26. If it is only required to increment the tape forwards in one direction, then only one roller 25 or 26 need be polished while the other, against which the pressure roller will only abut during rewinding, can, to advantage, present a rougher surface, thus improving the drive on the tape. Positioned between the two rollers 25 and 26 is the electromagnetic solenoid 93,94 and two undriven idle or deflecting rollers 27,28 which are intended to hold the magnetic tape in abutment with the surface 10*a* of the magnetic head.

The rectangular space defined by line A1 and the inner surfaces of the sidepieces 18,19 and the end wall 17 is intended to accommodate the cassette.

The two units 3–16 and 17–28 can be moved in relation to each other from the shown position to a position in which the two lines A1 and A2 coincide with each other. The last mentioned position is the operational position, while the former position in which lines A1 and A2 are spaced apart is the position for inserting and removing the cassette together with the tape. The tape cassette is inserted in the fitting simply by placing the closed front end surface of the cassette against the end wall 17 while at the same time causing the cassette to slope towards the plane of the drawings, whereafter the end of the cassette presenting the exposed portion of the tape is moved down against the pins 23,24.

The two rollers 25 and 26 constantly rotate in one and the same direction, even when the tape is stationary, e.g. clamped by the electromagnetic tape brake 9. The direction of rotation is dependent upon whether the tape is being advanced or rewound.

FIG. 2 shows an essential portion of a tape cassette for insertion into the tape recorder illustrated in FIG. 1. As previously mentioned, the cassette is essentially in the form of a flat, rectangular box presenting a bottom 29, sidewalls 30, two end walls of which only one, 31, is shown, while the other is straight and of the same thickness as the sidewalls, and a cover plate 32 (shown in FIGS. 4A and 4B) made of hard transparent plastic material, e.g. acrylic glass, and extending parallel to the bottom 29.

The end wall 31 is provided with a plurality of recesses and apertures, the purpose of which will be disclosed in the following. The magnetic tape B is shown in the form of a chain line, and extends from the interior of the cassette through a slot 34 in the end wall 31 (no slot, however, is provided in the bottom 29 or the cover plate 32) and through a plurality of grooves serving as guides, in the end wall, finally to reenter the cassette. The tape can be in the form of an endless band, but in the present instance it is assumed that the two ends of the tape are secured within the cassette, whereby during advancement and respooling of the tape in a manner known per se the tape lies in loops within the cassette.

It is generally more expedient to wind the tape backwards and forwards than to allow it to move constantly in the same direction. This is because in the former case the tape is fed out from the cassette in the same way as it is fed in, and hence tension on the tape is less.

In principle there is nothing to prevent the tape from being wound backwards and forwards between two tape-winding reels in the cassette but, for reasons mentioned in the introduction, it is usually common practice to allow the tape to settle in the cassette in wide sinuous loops; the free distance between the bottom 29 of the cassette and the cover glass being somewhat greater than the width of the tape. In FIG. 2 a small portion of the end wall of the cassette has been broken away at 33 to show the guide groove in which the tape moves outside the cassette. This guide groove is shown in more detail in FIGS. 4A and 4B.

Among the said recesses in the end wall of the cassette shown in FIG. 2 are two recesses 25$a$ and 26$a$ intended to accommodate their respective tape drive rollers 25 and 26, which in this instance do not form part of the cassette. It is desirable, however, that the drive rollers do comprise part of the cassette, in which case they should be capable of being readily connected to their respective drive shafts by means of some form of snap clutch coupling or magnetic coupling, which may be a permanent magnet. The portion of the cassette shown in FIG. 2 is shown in approximately full scale. The portions of the inside of the recesses 25$a$,26$a$ turned towards the tape B are essentially circular-cylindrically curved and are concentric with their respective drive rollers 25,26, respectively, when the cassette is placed on the tape recorder so that said drive rollers 25,26 project into said recesses (see FIG. 3) identified by the reference numerals 25$a$,26$a$ in FIG. 2. The loops of tape passing around the drive rollers 25,26 cover more than one-quarter of the periphery of said rollers, preferably one-third to four-ninths. The concentric position is ensured by guide pins 23,24 which engage in corresponding tight-fitting guide holes in the end wall of the cassette. When removing the cassette shown in FIG. 2, the tape B as a result of its inherent elasticity adopts the position shown in FIG. 2 within and outside the end wall so that the tape directly engages the circle-cylindrical concave inner surfaces of the recesses 25$a$,26$a$, where the tape is retained by a certain force instrumented by its friction against said inner surfaces, and extends essentially straight between the recesses 25$a$,26$a$, without presenting any appreciable tendency to buckle outwardly.

In order to understand the drawing correctly, it should be particularly noted that all the recesses shown in FIG. 2 and indicated with the numeral $a$ extend transversely through the bottom 29 of the cassette and also, although not absolutely necessary, through the cover member or beyond the same, since the cover member suitably only extends somewhat beyond the inside of the end wall of the cassette, e.g. as shown in FIGS. 4A and 4B, where the thickness of the cover is indicated by the reference numeral 32.

FIGS. 4A and 4B are cross sections through the line IV–IV in FIG. 3 and show alternative embodiments of the outer edge face of the end wall 31 of the cassette, and the projection 8 and 8′ on member 7 cooperating with said edge face, see also FIG. 1. It is seen here how the tape B is guided in the channel between the projection 8 and the groove in the edge face of the end wall 31. FIG. 4B differs from FIG. 4A only in that the tape B rests in an undercut groove in the end wall of the cassette, so that the edges of the groove engage around the edges of the tape and prevent the tape from bulging out of the groove, while the cassette is not being used, i.e. not inserted in the tape recorder and thus not engaged within the groove. It has been found, however, that such undercut grooves are not necessary in the special design of the cassette shown in FIGS. 2 and 3, and when common tape dimensions are used, namely a tape 12.5 mm. wide (one-half inch) and about 50 $\mu$m. (2 mils) thick, the tape material being a suitable polyester, such as Mylar®.

As previously mentioned, the cassette is placed in the tape recorder by guiding the same obliquely downwards between the sidepieces 18 and 19 towards the end wall 17 of the cassette fitting or holder (see FIG. 1), whereafter the end wall 31 of the cassette is moved to the position shown in FIG. 3, so that the guide pins 23,24, the tape rollers 25,26 the deflecting rolls 27,28 and the tape brake solenoid 93 lie in corresponding recesses in the end wall 31 of the cassette, see FIG. 3.

When the cassette has been inserted in this way, the two units 3–16 and 17–28 are moved towards each other, whereupon it should be observed that the cassette 29–32 which rests on the support bars 20 (FIG. 1) of the cassette fitting or holder and contains the tape B, is also included in the unit 17–28 and is moved together therewith if the tape recorder is designed so that the unit 3–16 is immovable in relation to the body of the tape recorder, and that the unit 17–28 is displaceable together with the cassette 29–32. The two units are moved linearly towards each other until they reach a position in which the two lines A1 and A2 (FIG. 1) coincide with each other, and thus also with the line A in FIGS. 2 and 3. The units can be moved manually by means of a lever on a displacement mechanism (not shown) but may also be effected electromagnetically or by means of an electromotor, possibly automatically in conjunction with inserting the cassette and when the cassette has reached its correct position in the fitting 2.

It should be particularly noted that when removing the cassette the two loops of the tape B in the cassette recesses 25$a$ and 26$a$ need no additional support in said recesses to the cylindrical inner surfaces thereof, against which the loops of tape abut as a result of their inherent elasticity. When the cassette is inserted in the tape recorder in the manner just described, the loops of tape thus pass over respective drive rollers 25,26 without it being necessary to hold said loops or adjust them manually, although the annular gap between the roller and associating recess, 25$a$ or 26$a$, in the cassette is rather narrow.

To avoid difficulties in inserting the cassette or damage to the tapes in the event that the loops of tape do not lie entirely correctly in the recesses, the drive rollers 25,26 taper upwardly and are rounded within an area which, when the cassette is completely inserted, extends beyond the width of the tape B, see FIGS. 4A and 4B.

The tape recorder functions in the following manner. It is assumed that the tape B in the cassette is empty, i.e. has nothing recorded thereon. Subsequent to bringing the lower elements 17—32 in (FIG. 1), i.e. including the cassette, into engagement with the upper elements 3—16, the tape-advancing means is energized. The operating mechanism is assumed to be adjusted so that the drive roller 25 is in feed position, i.e. that the pressure roller 11 is pressed against the drive roller 26 so that the tape B is also pressed thereagainst. The electromagnet 91 (FIG. 1) of the tape brake is energized so that the tape is clamped between its surface 92 and the surface 94 of the solenoid 93; the tape being clamped to approximately 4—6 percent of its thickness, and the airgap in the magnetic circuit being very small.

The drive rollers 25,26 rotate clockwise, irrespective of whether the tape is held stationary by means of the brake 9 or not, see in particular FIG. 3. The brake magnet 9 compresses the tape by a force in the order of 1—1.5 kg. (about 3 lbs.). When the electromagnet 91 is deenergized, the brake nevertheless acts with a force of approximately 30—50 g., to maintain tension in the tape during playback, recording and/or rewinding. Because the drive roller 11 rotates, the tape is thus held stretched by a suitable force between the roller and the brake so that the tape tightly contacts the surface (10$a$ in FIG. 1) of the recording head 10 intended for this purpose.

The drive rollers, namely 26 when playing back and 25 when rewinding, function according to the well-known capstan principle. The calculating machine or the like, from which information is to be fed to the tape recorder, controls the tape recorder in the following manner. When the calculating machine transmits an input or output signal in binary code form, it sends a control signal to the brake magnet 9 of the tape recorder so that said brake is deenergized for a brief moment, and disengages the tape. The drive roller 26 then draws the tape immediately past the magnet head 10, which records one single row (e.g. five positions) on the tape. The tape can be incremented or indexed, in the said manner, at a speed of approximately 1,200 rows/second, and thus at a number of movement steps each corresponding to approximately 0.2 mm. per second. In practice this corresponds to an average tape speed of 24 cm./second, the time required per row and movement step being approximately 0.7 milliseconds. The tape can be played back, e.g. for supplying information to a data-processing machine, either so that the total amount of information on the tape is played back in an uninterrupted sequence, wherein the brake magnet is deenergized until the whole tape has passed the head, or by advancing the tape in increments, row for row. In the latter instance the data machine sends an output signal which deenergized the brake magnet, and as soon as a row has been played back or read reactuates the magnet, whereupon the tape is relocked by the brake.

If all electrical and mechanical delays are taken into account, it takes approximately 50 microseconds for the tape to reach full recording (or reproducing) speed from the time the tape recorder receives the control signal from the calculating machine until said tape is released by the brake.

A delay of approximately equal length arises in the case when the tape is stopped by the brake. However, the extent of these delays is not sufficient to prevent said recording or reproducing speed of 1,200 rows/second from being reached and maintained also in practice. It should also be mentioned that the aforedescribed electromagnetic brake 9 is so designed that the magnetic force lines do not pass through the tape, but pass outside its edges, owing to the fact that the surfaces 92 and 94 abutting the tape comprise nonmagnetic material, wherewith the corresponding pole surfaces of the magnet 91 and the solenoid 93 each lie outside its respective edge of the tape.

Because the solenoid 93 is urged against the magnet 91 with a spring force even when the magnet is not energized, the airgap can be kept very narrow (in the order of 1—2 microns). In this way the desired fast response of the magnet can be obtained necessary to increment the tape forward at a rate of 1,200 rows per second.

For the purpose of winding the tape from right to left in FIGS. 1 and 3, the operating mechanism is reversed by rotating the eccentric 45 so that the angular arm 41 is swung to the right in FIG. 1 by means of the spring 44, whereupon the pressure roller 11 is removed from the tape and the pressure roller 3 is engaged against the tape while the drive motor is simultaneously reversed and the brake magnet 91 deenergized by the switch 46. At the same time the speed of the drive motor may possibly be increased by means of the switch. The operating mechanism may also have a nonoperative position in which the drive motor is disengaged, the two pressure rollers 3,11 removed from the tape (this is not an absolutely necessary measure) and the brake 9 deenergized. This nonoperative position, however, is reached in any event when the two said units are moved apart, usually when the tape cassette is to be inserted or removed.

What I claim is:

1. A magnetic tape recorder for incremental and continuous recording and playback comprising two engageable units relatively disengageable from each other in a coplanar relation to enable a cassette to be inserted in one of said units and then reengaged for use, the first of said units comprising means for centering the cassette, electrical means forming a first part of a braking means for the tape, two rotatable drive rollers on opposed sides of said braking means, a motor for continuously rotating said drive rollers in the same direction and for simultaneously reversing both drive rollers to continuously rotate in the opposite direction, the second of said two units comprising electrical means forming a second part of the braking means cooperating with said first part when the two units are engaged, two pressure rollers each separately cooperable with one of said drive rollers, at least one magnetic head between said drive rollers for recording and playing back whereby when the two units are engaged and a tape cassette is disposed in said first unit the tape passes over both drive rollers, the two parts of the electrical braking means cooperating when energized to stop movement of the tape passing therebetween and wherein only one of said two pressure rollers engage the tape passing over the associated drive roller and further comprising means for alternating the engagement of said pressure rollers with the tape passing over its associated drive roller depending on the direction of passage of the tape through the recorder for recording and rewinding, said braking means when deenergized exerting a light braking action on the tape to tension the tape as it is driven by said drive rollers.

2. A magnetic tape recorder as claimed in claim 1, wherein the drive roller which is free of engagement with its associated pressure roller serves to feed tape from the cassette to the at least one magnetic head and further comprising means for reversing the motor for driving the drive rollers, said reversing means also effecting engagement of one of the pressure rollers with the tape passing over its associated drive roller and means for controlling the speed of rotation of said drive rollers.